(12) United States Patent
Crane et al.

(10) Patent No.: US 6,493,192 B2
(45) Date of Patent: Dec. 10, 2002

(54) DISC DRIVE WITH IMPROVED HEAD PITCH ADJUSTMENT

(75) Inventors: Peter Crane, Richfield, MN (US); Markus E. Mangold, Eden Prairie, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/880,343

(22) Filed: Jun. 13, 2001

(65) Prior Publication Data

US 2001/0053050 A1 Dec. 20, 2001

Related U.S. Application Data

(60) Provisional application No. 60/236,009, filed on Sep. 27, 2000, and provisional application No. 60/213,087, filed on Jun. 20, 2000.

(51) Int. Cl.[7] .................................................. G11B 5/56
(52) U.S. Cl. ................................................... 360/294.3
(58) Field of Search ........................... 360/294.3, 294.4, 360/294.2, 245.3, 245.4, 245.9, 246.7, 264.5, 78.05

(56) References Cited

U.S. PATENT DOCUMENTS

| | | | |
|---|---|---|---|
| 5,850,320 A | 12/1998 | Warmka et al. | 360/104 |
| 5,856,896 A | 1/1999 | Berg et al. | 360/104 |
| 5,991,122 A | * 11/1999 | Tangren et al. | 360/244.2 |
| 6,011,671 A | 1/2000 | Masse et al. | 360/104 |
| 6,055,132 A | 4/2000 | Arya et al. | 360/104 |
| 6,078,473 A | 6/2000 | Crane et al. | 360/104 |
| 6,078,476 A | 6/2000 | Magee et al. | 360/106 |
| 6,122,149 A | 9/2000 | Zhang et al. | 360/294.5 |
| 6,157,522 A | 12/2000 | Murphy et al. | 360/294.6 |
| 6,163,434 A | 12/2000 | Zhang | 360/106 |
| 6,166,890 A | 12/2000 | Stefansky et al. | 360/294.4 |
| 6,201,668 B1 | 3/2001 | Murphy | 360/294.4 |
| 6,246,552 B1 * | 6/2001 | Soeno et al. | 360/294.4 |
| 6,351,354 B1 * | 2/2002 | Bonin | 360/245.9 |

FOREIGN PATENT DOCUMENTS

| | | |
|---|---|---|
| EP | 0 840 291 A2 | 5/1998 |
| EP | 0 977 180 A1 | 2/2000 |
| JP | 11259998 | 9/1999 |

OTHER PUBLICATIONS

"Electrostatic Microactuator and Design Consideration for HDD Applications", by L.–S. Fan et al., *IEEE*, 1999, pp. 1000–1005.

* cited by examiner

Primary Examiner—David Davis
Assistant Examiner—Jennifer M Dolan
(74) Attorney, Agent, or Firm—Westman, Champlin & Kelly (57) ABSTRACT

A disc drive includes a disc, a voice coil motor with an arm and a beam having a first end attached to the arm and a second end including a window frame and a gimbal region. A bridge of a gimbal strut underlies the gimbal region. A flex circuit is attached to the gimbal strut. A read/write head has a preload region under the bridge and a slider surface on the disc. A microactuator has a main body and has microactuator arms bonded to the read/write head and mount arms bonded to the bridge. The microactuator has electrical contacts connected to the flex circuit. The electrical contacts are disposed between the microactuator main body and the gimbal region.

19 Claims, 9 Drawing Sheets

DISC DRIVE WITH IMPROVED HEAD PITCH ADJUSTMENT

CROSS-REFERENCE TO RELATED APPLICATION

This application claims priority benefits from U.S. Provisional Application No. 60/213,087 titled "Assembly of disc drive suspension, microactuator, and recording head," filed Jun. 20, 2000, and from U.S. Provisional Application No. 60/236,009 titled "Assembly of disc drive suspension, microactuator, and recording head," filed Sep. 27, 2000.

FIELD OF THE INVENTION

The present invention relates to disc drive data storage devices. In particular the present invention relates to suspension and electrical connections for heads used in disc drive storage devices.

BACKGROUND OF THE INVENTION

Figure 1:
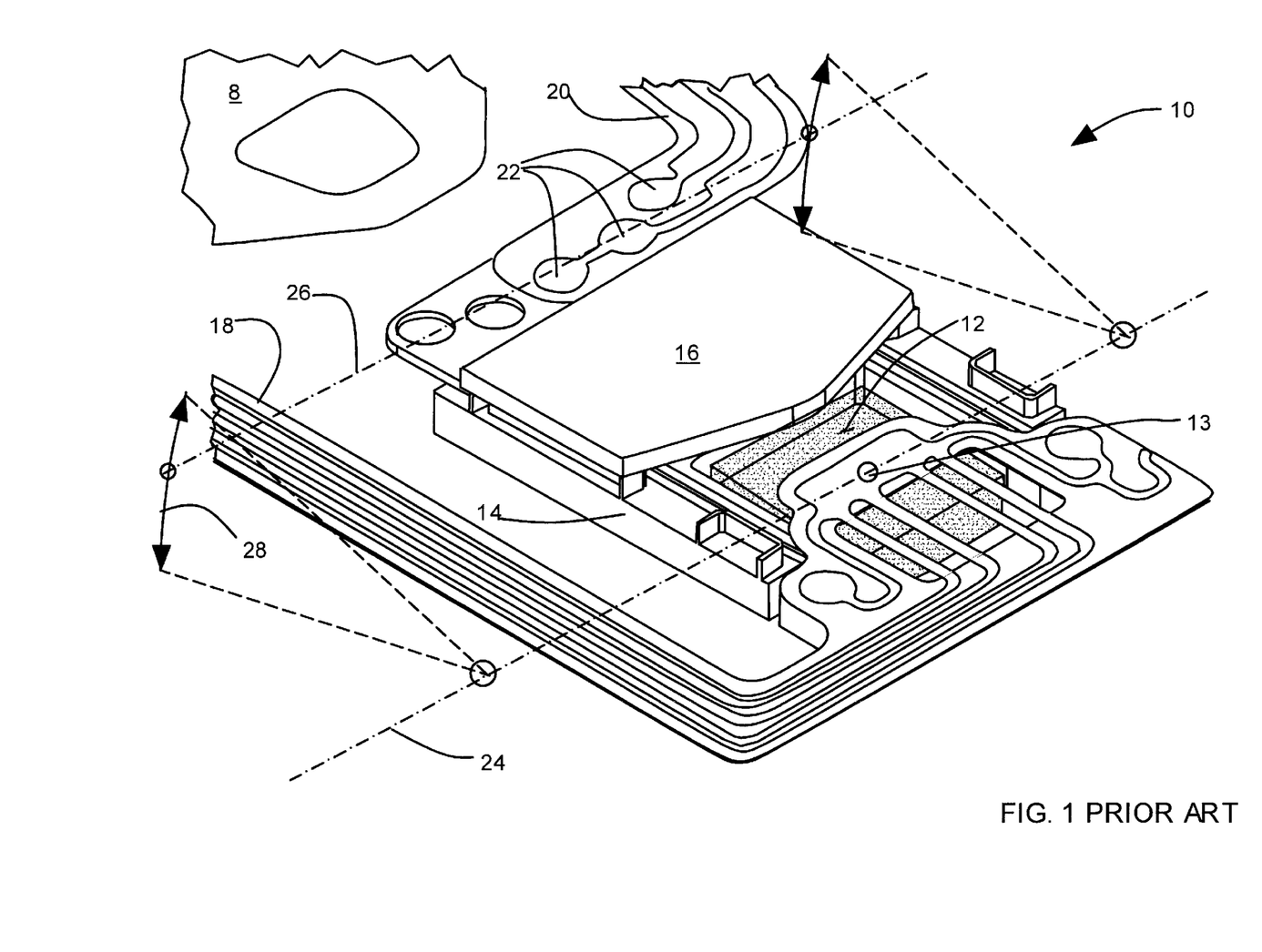
FIG. 1 illustrates a PRIOR ART head-gimbal assembly with microactuator contacts widely separated from a pitch axis of a head.

In a prior art disc drive storage device illustrated in FIG. 1, a slider 12 with a read/write head slides over an air bearing on a disc surface. An arm on a head assembly (not illustrated) provides a load force at gimbal point 13 on the slider 12. The load force is generally perpendicular to the disc surface and presses the slider toward the disc surface. A pitch axis 24 that is generally perpendicular to the direction of disc movement under the slider 12 passes through gimbal point 13. The load force holds the slider 12 in close proximity to the disc. The slider 12 is mounted to a microactuator 16, and the microactuator 16 is mounted by way of microactuator mounting arms 14 to a flexible strut (not illustrated in FIG. 1). The microactuator 16 has microactuator electrical contacts 22 along a microactuator contact axis 26 that is general parallel with pitch axis 24. The microactuator 16 is placed between the slider 12 and the electrical contacts 22. When the pitch of slider 12 is adjusted around the pitch axis 24, the electrical contacts 22 deflect an amount 28 as a result of the adjustment around the pitch axis 24. The deflection 28 is large because of the relatively large spacing between the pitch axis 24 and the contact axis 26.

A first flex circuit 18 is connected to the slider 12 near the pitch axis 24 and flexes a relatively small amount with pitch adjustments of slider 12. A second flex circuit 20, however is connect to the microactuator electrical contacts 22 along axis 26. The second flex circuit 20 deflects a larger amount 28. When the second flex circuit 20 is deflected this larger amount 28, it exerts an undesired restraining force tending to resist or interfere with the pitch adjustment of slider 12. The adjustment of the slider 12 around the pitch axis 24 is restrained and pitch alignment of the slider 12 with the underlying disc is compromised.

A method and apparatus are needed to allow pitch adjustment of a read/write head with reduced interference from a flex circuit connected to a microactuator in which the read/write head is mounted.

SUMMARY OF THE INVENTION

A disc drive is disclosed that includes a disc and a voice coil motor having an arm. Attached to the arm is a first end of a beam. The beam has a second end that includes a window frame and a gimbal region. The disc drive also has a gimbal strut that includes a bridge underlying the gimbal region of the beam. A flex circuit is attached to the gimbal strut. The disc drive also includes a read/write head that has a preload region under the bridge and a slider surface on the disc.

The disc drive further includes a microactuator that has a main body, microactuator arms bonded to the read/write head, and mount arms bonded to the bridge. The microactuator has electrical contacts connected to the flex circuit. The electrical contacts are disposed between the main body of the microactuator and the gimbal region.

The electrical contacts are positioned close to the pitch axis, and little deflection of the flex circuit is present during pitch adjustments of the read/write head. Mechanical interference from the flex circuit is reduced and an improved adjustment of the pitch is obtained. Additional features and benefits will become apparent with a careful review of the following drawings and the corresponding detailed description.

DETAILED DESCRIPTION

In the embodiments described below, electrical contacts of a microactuator are positioned close to a pitch axis of a read/write head. A flex circuit connects to the microactuator electrical contacts. The microactuator electrical contacts are positioned between a main body of the microactuator and a pitch axis of the read/write head. Little deflection of the flex circuit is present during pitch adjustments of the read/write head. Mechanical interference from the flex circuit is reduced and an improved adjustment of the pitch is obtained. Components of an exemplary disc drive and their assembly are illustrated below in FIGS. 2–11.

Figure 2:
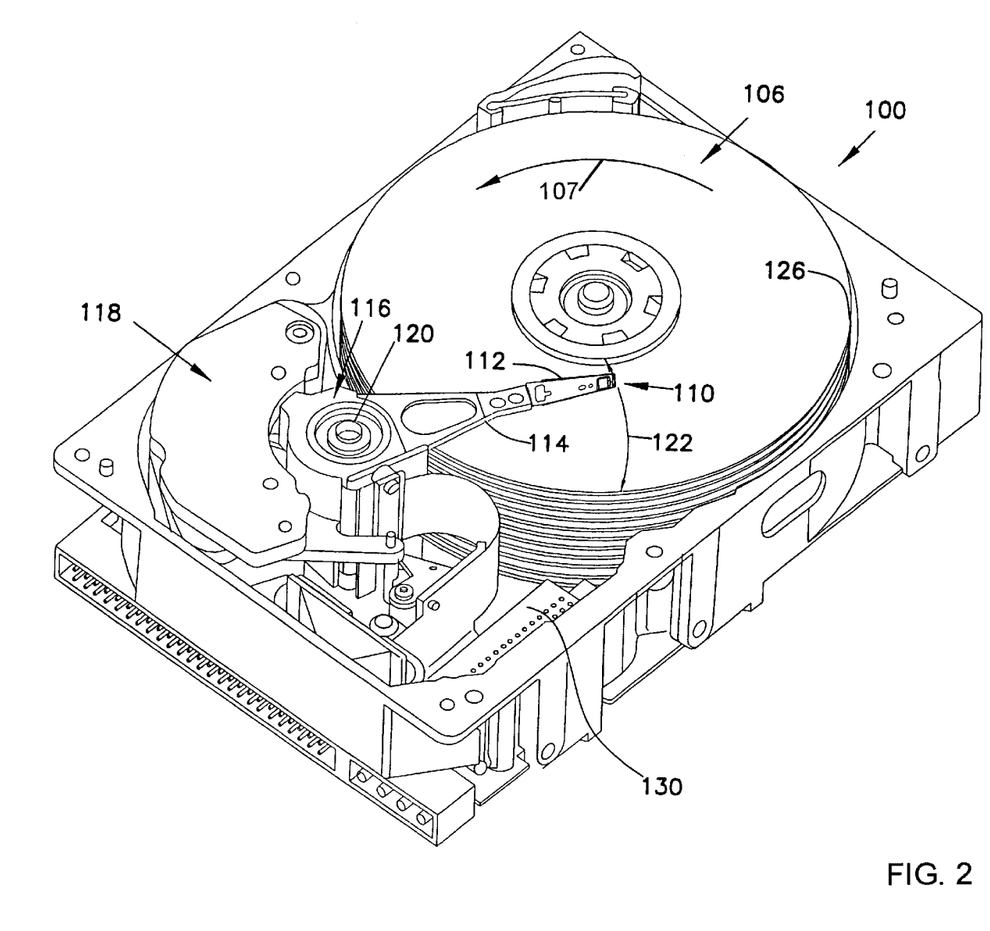
FIG. 2 illustrates a disc drive storage device.

In FIG. 2, an embodiment of a disc drive 100 is illustrated. Disc drive 100 includes a pack of multiple discs 126 having storage surfaces 106 that are typically layers of magnetic material. The disc drive 100 also includes a head gimbal assembly (HGA) 112 that includes a read/write head 110 for each stacked disc. The head gimbal assembly 112 is attached to an arm 114 of a voice coil motor 118. The pack of discs 126 is spun or rotated as shown by arrow 107 to allow the head-gimbal assembly 112 to access different rotational locations for data on the storage surfaces 106 of the discs 126.

The head gimbal assembly 112 is actuated to move radially, relative to the discs 126, as shown by arrow 122 to access different radial locations for data on the storage surfaces 106 of discs 126. Typically, the actuation of head gimbal assembly 112 is provided by the voice coil motor 118. Voice coil motor 118 includes a rotor 116 that pivots on axle 120. The arm 114 actuates the head gimbal assembly 112. Head gimbal assembly 112 also includes a microactuator that operate in cooperation with voice coil motor 118 to track or follow tracks recorded on storage surfaces 106 using servo control techniques. Disc drive 100 includes electronic circuitry 130 for controlling the operation of the disc drive and transferring data in and out of the disc drive. The head gimbal assembly 112 is explained in more detail below in connection with FIGS. 3–11.

Figure 3:
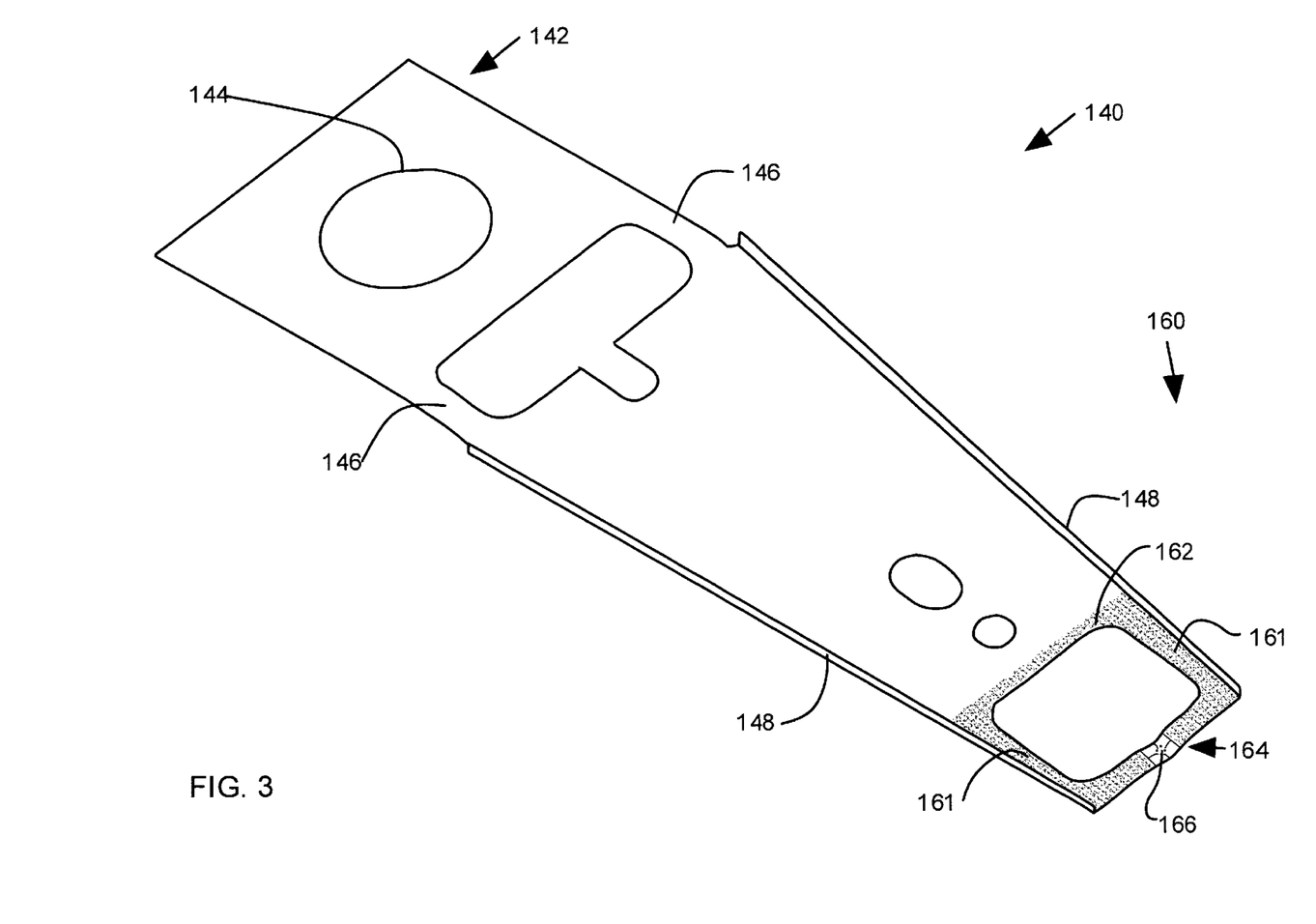
FIG. 3 illustrates a top isometric view of a load beam.

FIG. 3 illustrates a top isometric view of a beam 140. Beam 140 functions as a load beam that applies a mechanical load to a read/write head. The beam 140 is preferably formed of stainless steel and extends from a first end 142 that includes a mounting hole 144 to a second end 160 that concludes a window frame 162 and a preload dimple 166 in a gimbal region 164. The beam 140 includes preload spring regions 146, which generate the preload force that is applied at the preload dimple 166. The main body of the beam 140 includes side rails 148 that extend alongside the window frame 162. Flat sections 161 on the sides of the window frame 162 join with the side rail 148 to form forming margins for the beam 140. The load force from preload spring regions 146 is transferred through the forming margins (straight sections 161 and adjacent portions of rails 148) which stiffen the beam 140 in the off-track direction. The forming margin is kept small, on the order of about 0.010 inches (0.025 cm) so that the load beam 140 does not encroach on a disc hub during operation of the disc drive. With this thin forming margin, the tip sway mechanical frequency resonance is kept above about 10 kHz.

Figure 4:
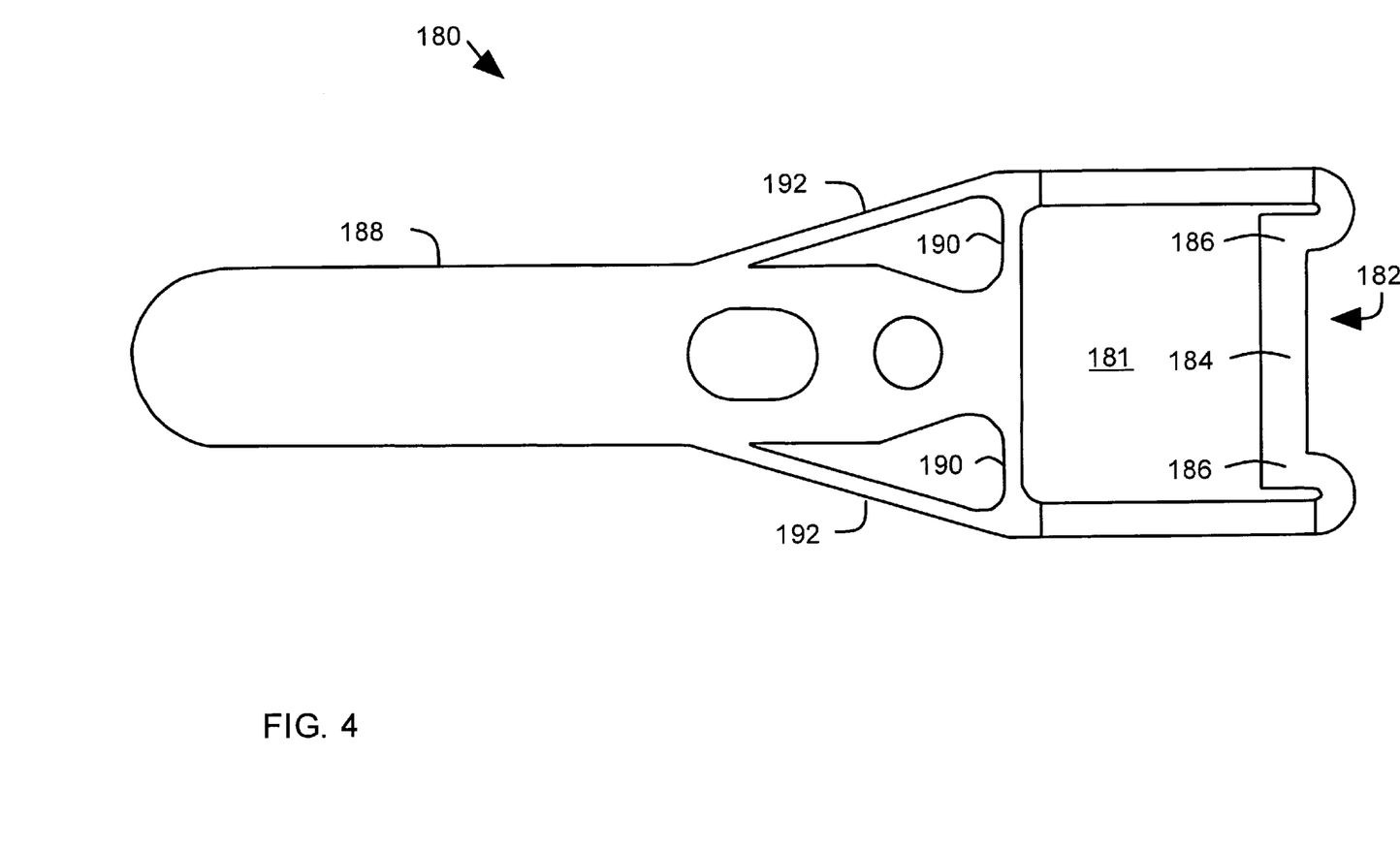
FIG. 4 illustrates a bottom view of a gimbal strut.

FIG. 4 illustrates a bottom view of a gimbal strut 180. Gimbal strut 180 is typically formed of stainless steel. Gimbal strut 180 has a main body 188 that extends to a pair of braces 192 and a pair of tethers 190, which support a bridge 182 at the end of the gimbal strut 180. Gimbal strut 180 includes an opening 181, which aligns with the opening in the window frame 162 in FIG. 3. The bridge 182 has bridge regions 186 that are later bonded to a microactuator as described below in connection with FIGS. 5 and 6. As explained below in connection with FIGS. 9–11, various configurations of gimbal struts can be used, depending on the needs of the application. The gimbal strut 180 of FIG. 4 is assembled with the beam 140 of FIG. 3 as described below in connection with FIG. 5.

Figure 5:
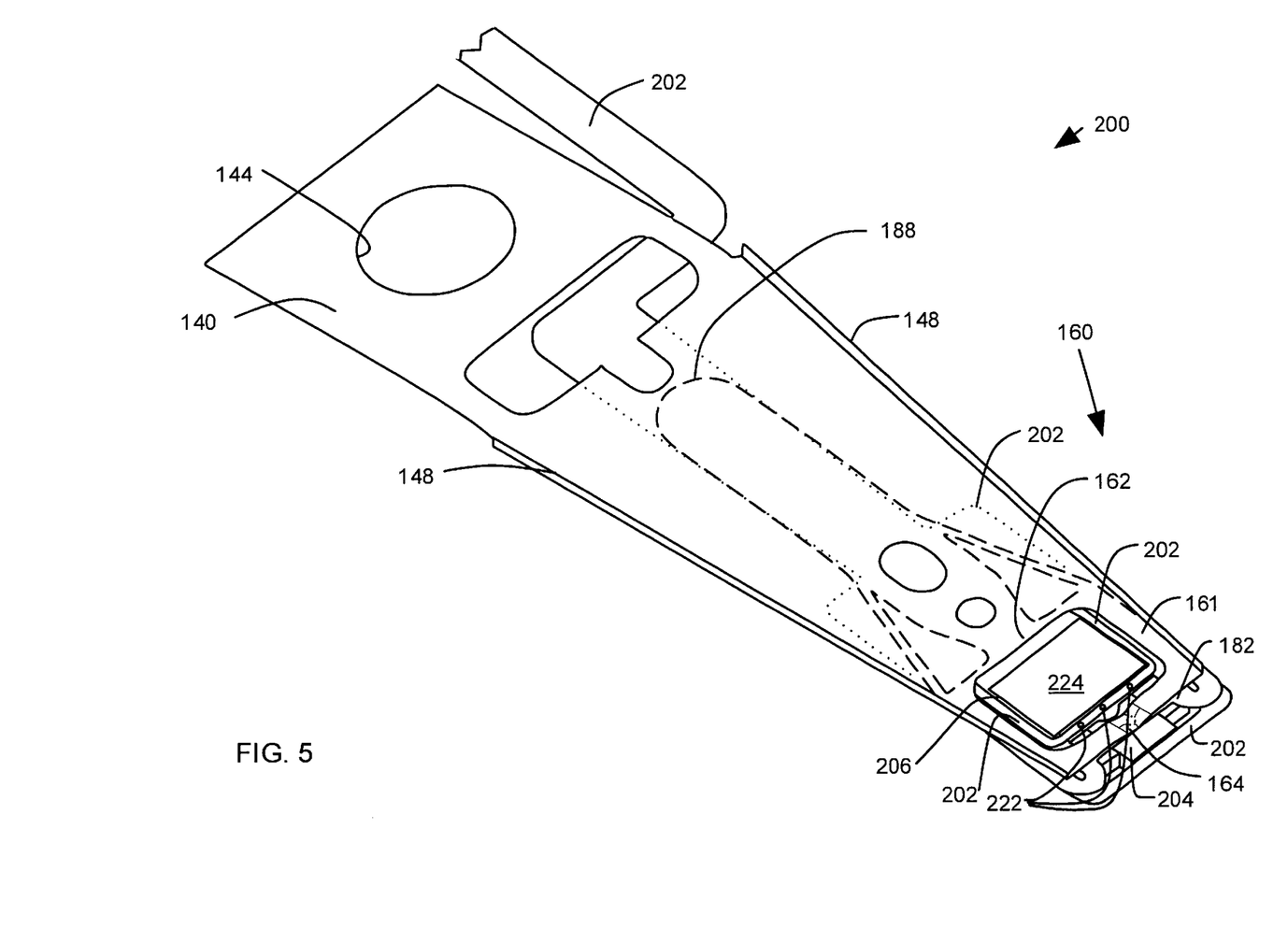
FIG. 5 illustrates a top view of an assembly of a load beam, gimbal strut, flex circuit, microactuator and head.

FIG. 5 illustrates a top view of a head gimbal assembly 200 that corresponds generally with the head gimbal assembly 112 illustrated in FIG. 2. Head gimbal assembly 200 includes the load beam 140 of FIG. 3 and the gimbal strut 180 of FIG. 4. The head gimbal assembly 200 also includes a flex circuit 202 that is electrically connected to a microactuator 206 and a read/write head 204 in the head gimbal assembly 200. The microactuator 206 includes a microactuator main body 224 that is surrounded by the window frame 162. The assembly of the head gimbal assembly 200 near the second end 160 of the load beam 140 is somewhat complex, and is enlarged and illustrated in more detail below in FIG. 6.

Figure 6:
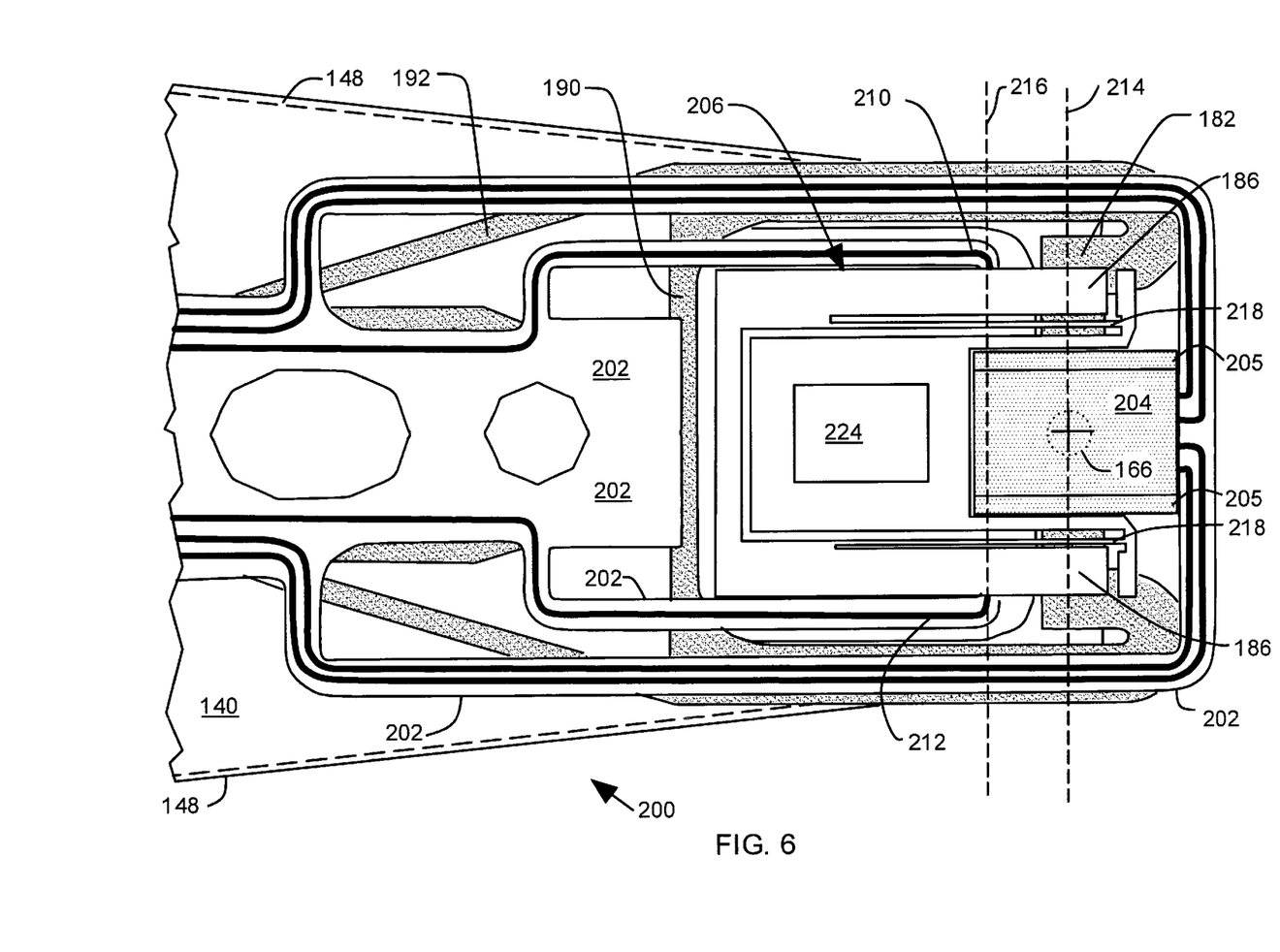
FIG. 6 illustrates a detailed bottom view of a portion of the assembly illustrated in FIG. 5.

FIG. 6 illustrates a detailed bottom view of a portion of the head gimbal assembly 200 at the second end 160 of the load beam 140. The view in FIG. 6 is taken from the side that faces disc 126 in FIG. 1. The flex circuit 202 has connections 210 and 212 that turn inwardly to make connection to electrical contacts (not illustrated here) on an electrical contact axis 216 near the main body 224 of the microactuator 206. The microactuator 206 is bonded to the bridge 182 at regions 186. The microactuator 206 is also bonded to the read/write head 204. The microactuator 224 includes thin flex arms 218 that allow for relative motion between the read/write head 204 and the bridge 182 when the microactuator 206 is actuated. As illustrated in FIG. 6, the read/write head 204 has a pitch axis 214 aligned with preload dimple 166. The electrical contact axis 216 is strategically placed between the microactuator main body 224 and the pitch axis 214. The electrical contact axis 216 is quite close to the pitch axis 214 and is not separated from the pitch axis 214 by the main body 224 of the microactuator 206. This arrangement is in contrast with the PRIOR ART arrangement shown in FIG. 1, in which the electrical contact axis 26 is widely separated from the pitch axis 24 by the microactuator 16. Further enlarged illustrations of examples of assemblies of heads, microactuators and flex circuits are described below in connection with FIGS. 7–8.

Figure 7:
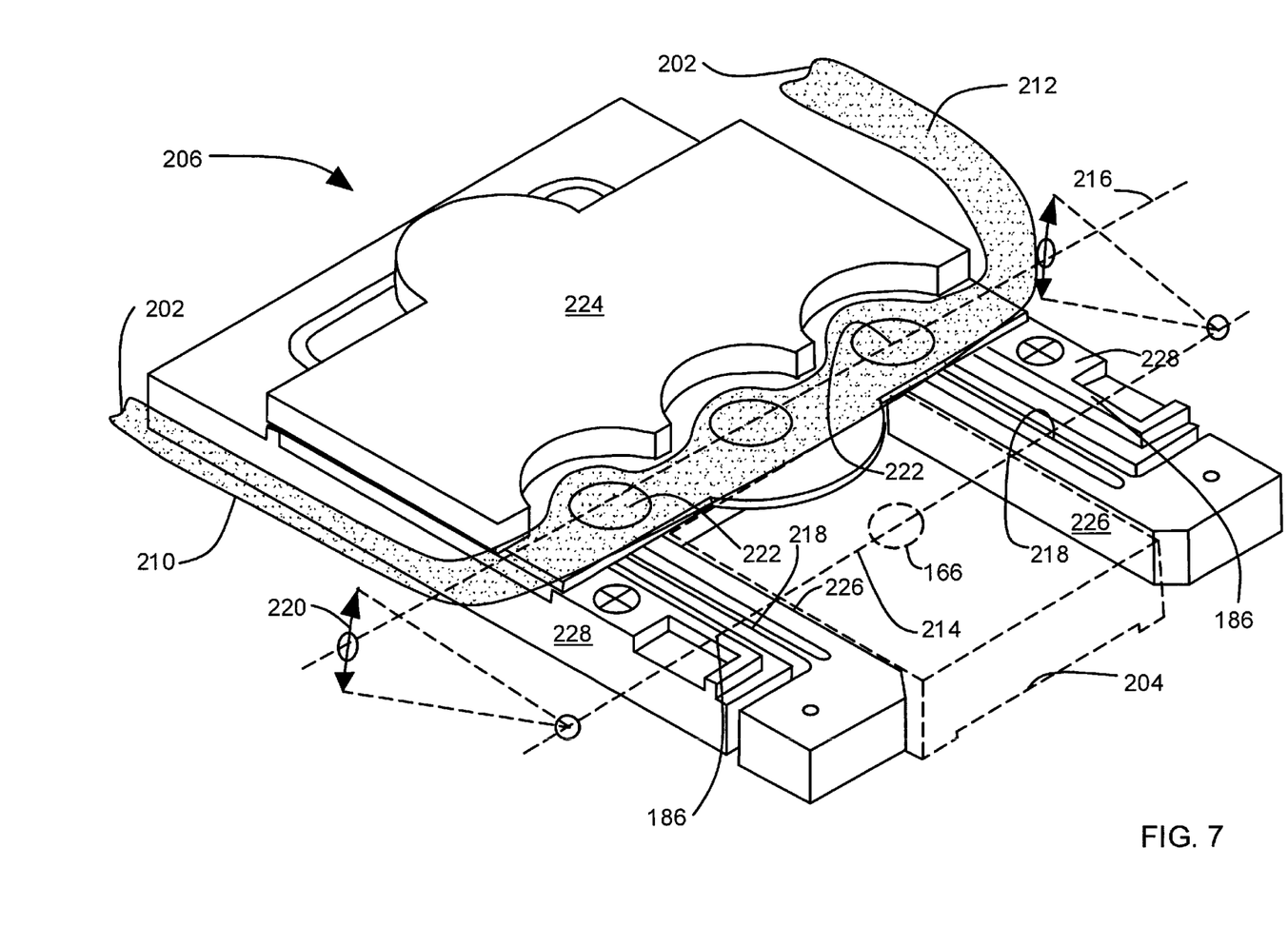
FIG. 7 illustrates a microactuator with three electrical contacts located close to a pitch axis of a head.

FIG. 7 illustrates a top isometric view of a three terminal actuator 206. Microactuator 206 includes a main body 224. Microactuator 206 includes microactuator arms 226 that are bonded to read/write head 204. The microactuator 206 also includes mount arms 228 that are bonded to the bridge 182 (see FIG. 4) at locations 186. The microactuator 206 has electrical contacts 222 that connect to the flex circuit 202. The electrical contacts 222 are disposed, as illustrated, between the main body 224 of the microactuator and the gimbal region 166. As illustrated in FIG. 7, the electrical contacts 222 are disposed at least partially over the read/write head 204. The electrical contacts 222 are also disposed within the window frame 162 (see FIG. 5). The main body 224 is also disposed within the window frame 162. The electrical contacts 222 are drive contacts for the microactuator 206.

Figure 8:
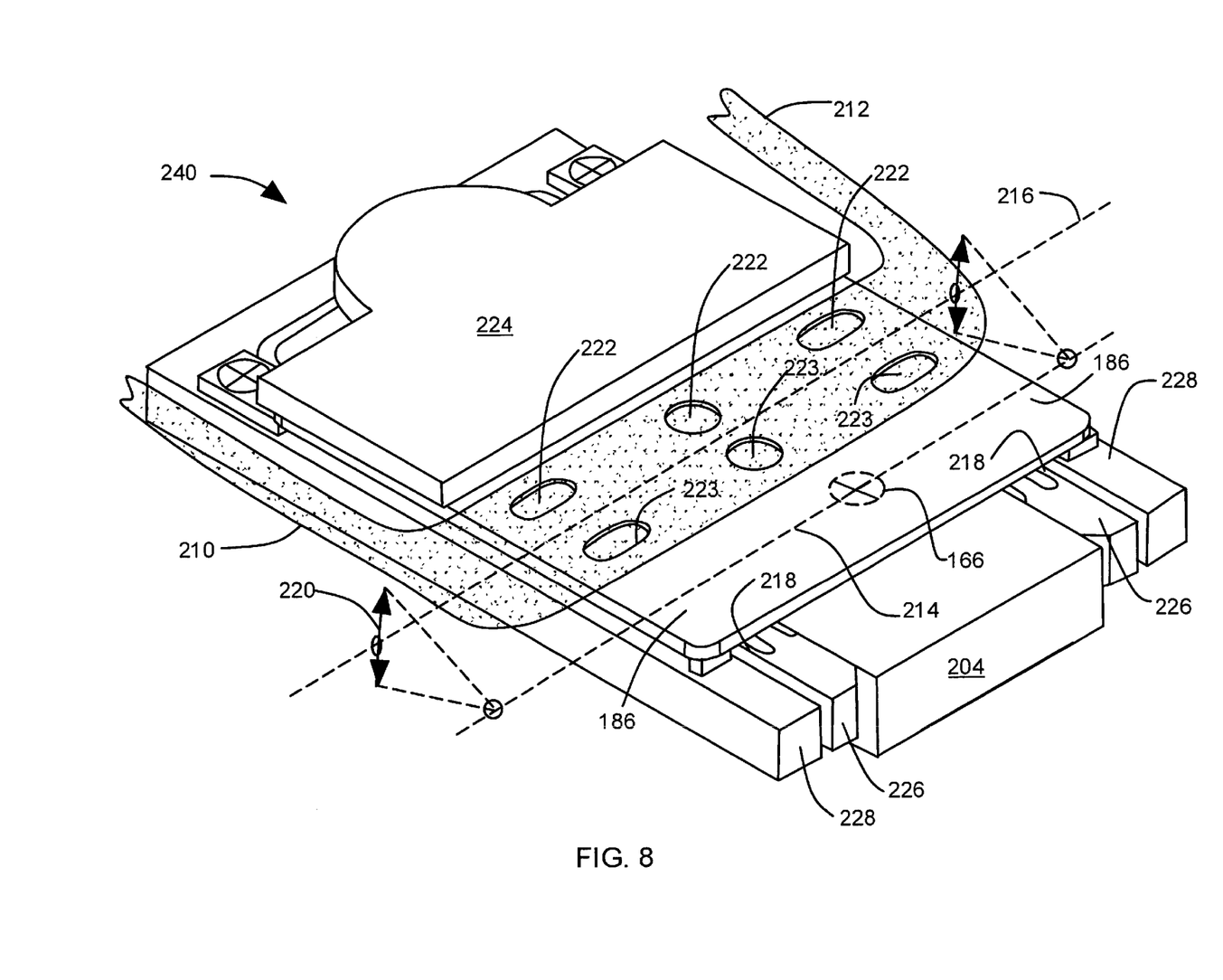
FIG. 8 illustrates a microactuator with six electrical contacts located close to a pitch axis of a head.

FIG. 8 illustrates a microactuator 240 that is similar to microactuator 206 of FIG. 7 except for the addition of electrical contacts 223. Electrical contacts 223, in other words velocity contacts 223, are contacts for the velocity sensing in the microactuator 240. The read/write head 204 is pitch adjustable around the pitch axis 214 passing through the gimbal region 166. The electrical contacts 222, 223 are arranged generally along an axis 216 that is parallel to the pitch axis 214. Contacts 222,223 are arranged between the main body 224 and the pitch axis 214.

Figure 9:
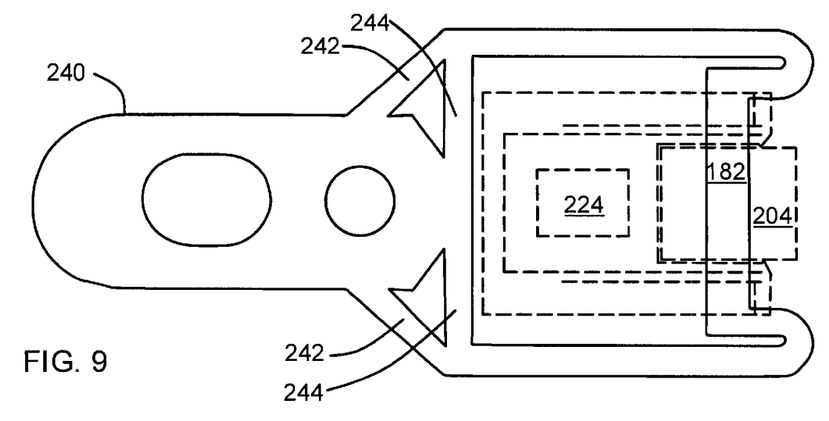
FIGS. 9–11 illustrate alternative embodiments of gimbal struts.
Figure 10:
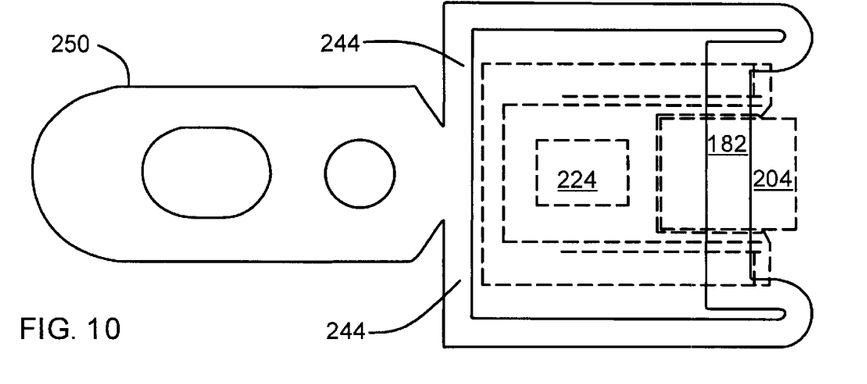
Figure 11:
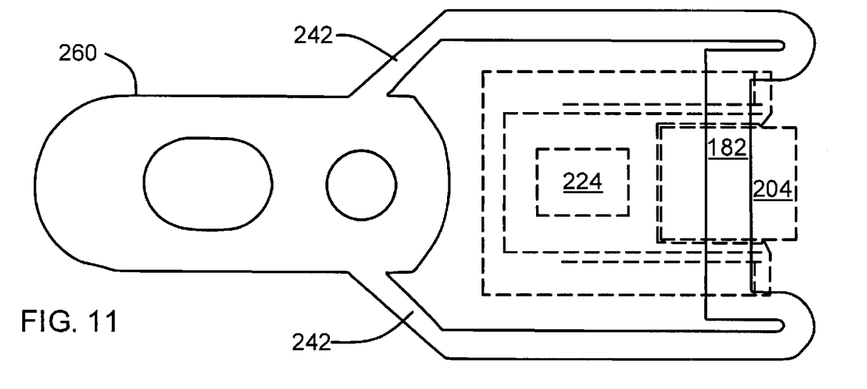

FIGS. 9–11 illustrate alternative embodiments of gimbal struts 240, 250, 260. For reference, the general positions of read/write head 204 and microactuator main body 224 are illustrated in dashed lines. Gimbal strut 240 includes braces 242 and tethers 244 in an arrangement that is similar to that illustrated in FIG. 4. The gimbal strut 250 includes tethers 244, but does not include braces. The gimbal strut 260 includes braces 242 but does not include tethers. The arrangement of a gimbal strut and dimensions suitable in a given application can be selected based on vibration and performance testing.

In summary, a disc drive (100) includes a disc (126), a voice coil motor (118) having an arm (114) and a beam (140) having a first end (142) attached to the arm (114) and a second end (160) including a window frame (162) and a gimbal region (164). A bridge (182) of a gimbal strut (180) underlies the gimbal region (164). A flex circuit (202) is attached to the gimbal strut (180). A read/write head (204) has a preload region (166) under the bridge (182) and a slider surface (205) on the disc (126). A microactuator (206) has a main body (224) and has microactuator arms (226) bonded to the read/write head (204) and mount arms (228) bonded to the bridge (182). The microactuator (206) has electrical contacts (222, 223) connected to the flex circuit (202). The electrical contacts (222, 223) are disposed between the microactuator main body (224) and the gimbal region (164).

In preferred arrangements, the main body (224) and the electrical contacts (222, 223) are disposed within the window frame (162), and the electrical contacts (222, 223) are positioned at least partially over the read/write head (204).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive while maintaining substantially the same functionality without departing from the scope and spirit of the present invention. In addition, although the preferred embodiment described herein is directed to a head pitch adjustment for a magnetic storage system, it will be appreciated by those skilled in the art that the teachings of the present invention can be applied to other systems, like optical or magneto-optic systems, without departing from the scope and spirit of the present invention.

What is claimed is:

1. A disc drive, comprising:

a disc;

a voice coil motor having an arm;

a beam having a first end attached to the arm and a second end including a window frame and a gimbal region;

a gimbal strut including a bridge underlying the gimbal region;

a flex circuit attached to the gimbal strut;

a read/write head having a preload region under the bridge and a slider surface on the disc; and a microactuator having a main body and having microactuator arms bonded to the read/write head and mount arms bonded to the bridge, the microactuator having microactuator electrical contacts connected to the flex circuit, the microactuator electrical contacts being disposed between the main body and the gimbal region.

2. The disc drive of claim 1 wherein the microactuator electrical contacts are disposed at least partially over the read/write head.

3. The disc drive of claim 1 wherein the microactuator electrical contacts are disposed within the window frame.

4. The disc drive of claim 3 wherein the microactuator electrical contacts further include velocity sensing contacts.

5. The disc drive of claim 1 wherein the microactuator electrical contacts include microactuator drive contacts.

6. The disc drive of claim 1 wherein the gimbal strut is assembled with the beam.

7. The disc drive of claim 6 wherein the gimbal strut includes a tether.

8. The disc drive of claim 6 wherein the gimbal strut includes a brace.

9. The disc drive of claim 1 wherein the read/write head is pitch adjustable around a pitch axis passing through the gimbal region and the microactuator electrical contacts are arranged generally along a line that is parallel to the pitch axis.

10. The disc drive of claim 1 wherein the beam includes side rails extending alongside the window frame.

11. The disc drive of claim 10 wherein the window frame includes flat sections extending to the side rails.

12. A disc drive, comprising:

a disc;

a voice coil motor having an arm;

a beam having a first end attached to the arm and a second end including a window frame and a gimbal region;

a gimbal strut including a bridge underlying the gimbal region;

a flex circuit attached to the gimbal strut;

a read/write head having a preload region under the bridge and a slider surface on the disc; and a microactuator having a main body and having microactuator arms bonded to the read/write head and mount arms bonded to the bridge, the microactuator having electrical contacts connected to the flex circuit, the electrical contacts being disposed between the main body and the gimbal region, wherein the main body of the microactuator is disposed within the window frame.

13. A disc drive, comprising:

a flex circuit, a head gimbal assembly with a microactuator main body that includes microactuator electrical contacts connected to the flex circuit, and including a read/write head with a pitch axis; and means for limiting the deflection of the flex circuit when the pitch of the read/write head is adjusted about the pitch axis, the means for limiting including disposing the microactuator electrical contacts between the microactuator main body and the pitch axis.

14. A method of limiting deflection of a flex circuit connected to a microactuator in a disc drive, comprising:

providing a flex circuit;

providing a read/write head with a pitch axis;

providing a microactuator with a microactuator main body that includes microactuator electrical contacts disposed between the microactuator main body and the pitch axis; and connecting the flex circuit to the microactuator electrical contacts to limit deflection of the flex circuit.

15. The method of claim 14 wherein the microactuator electrical contacts include microactuator drive contacts.

16. The method of claim 15 wherein the microactuator electrical contacts include velocity sensing contacts.

17. The method of claim 14, further comprising:

disposing the microactuator electrical contacts at least partially over the read/write head.

18. The method of claim 14, further comprising:

disposing the microactuator electrical contacts within a window frame of a load beam providing a preload force to the read/write head.

19. A method of limiting deflection of a flex circuit connected to a microactuator in a disc drive, comprising:

providing a flex circuit;

providing a read/write head with a pitch axis;

providing a microactuator with a main body and with electrical contacts disposed between the main body and the pitch axis; and connecting the flex circuit to the electrical contacts to limit deflection of the flex circuit, wherein the electrical contacts include microactuator drive contacts and disposing the main body of the microactuator within the window frame.

* * * * *